June 19, 1934. K. SCHATZ 1,963,718
MEAT APPORTIONING MACHINE
Filed March 7, 1931 2 Sheets-Sheet 1
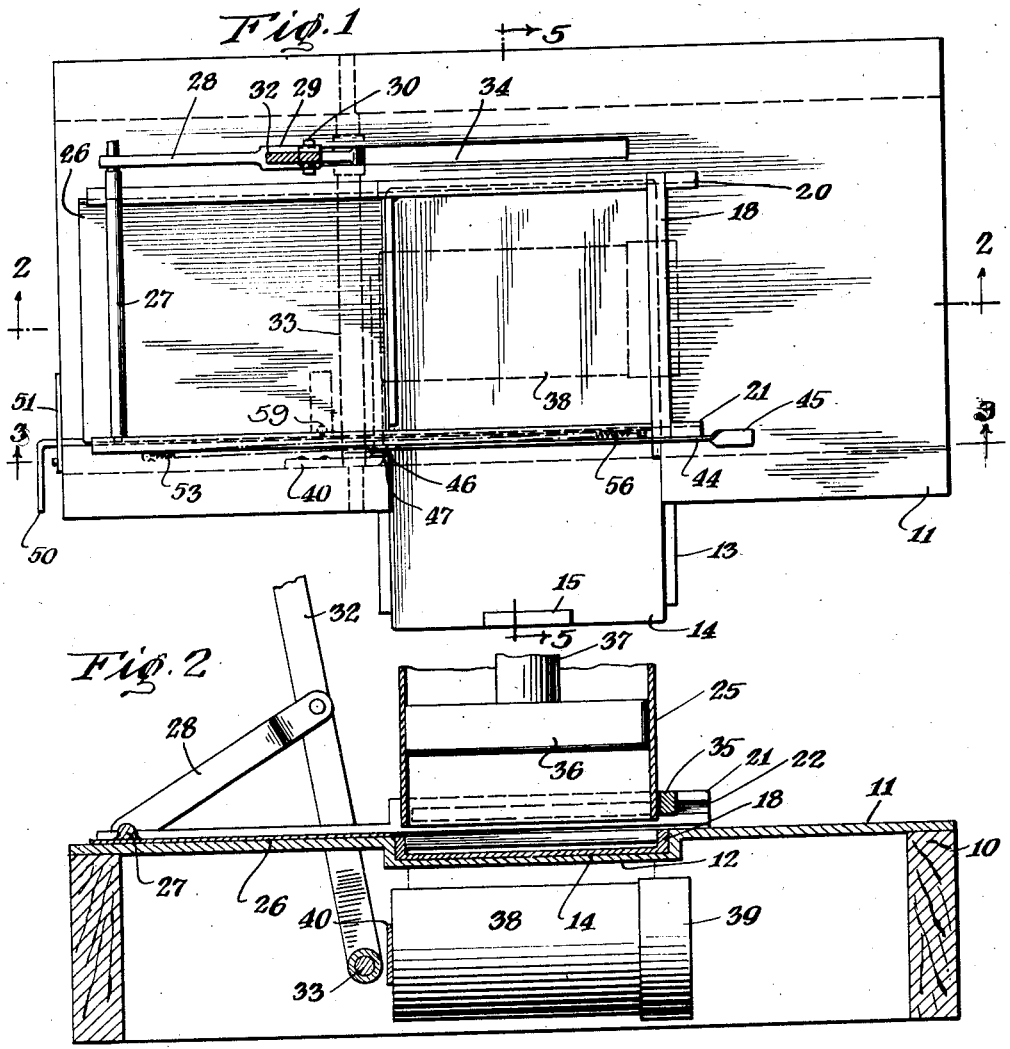
Inventor
Karl Schatz
By his Attorney
George C. Heinicks

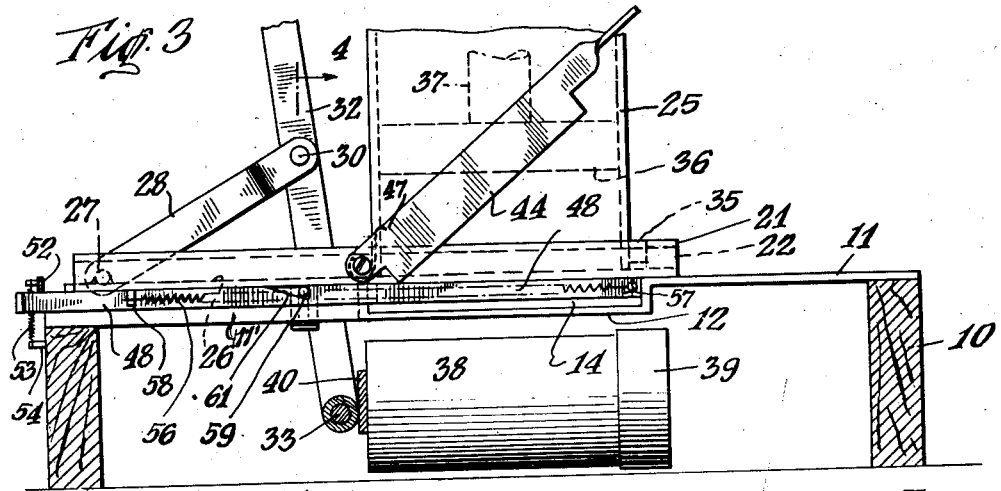
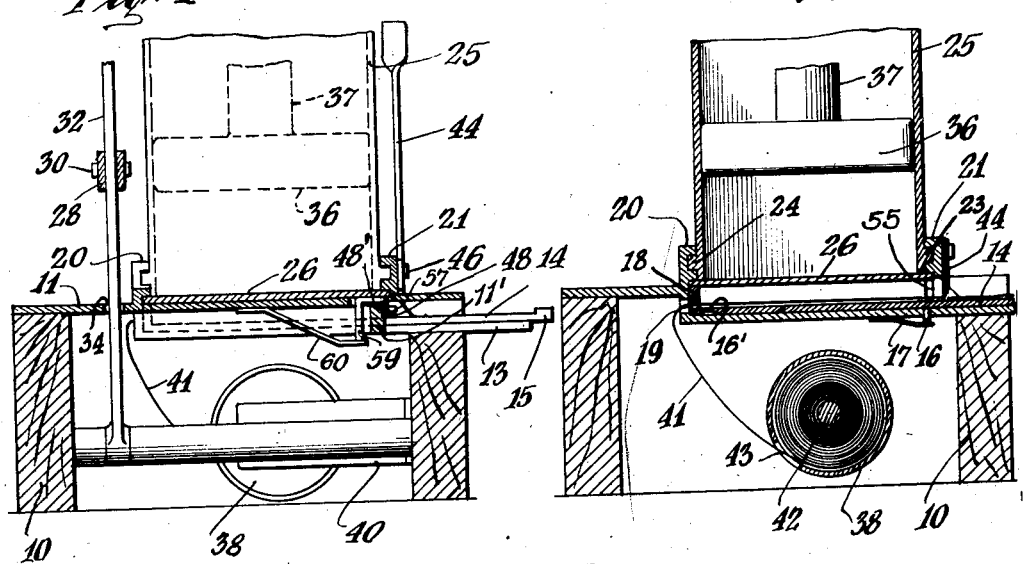
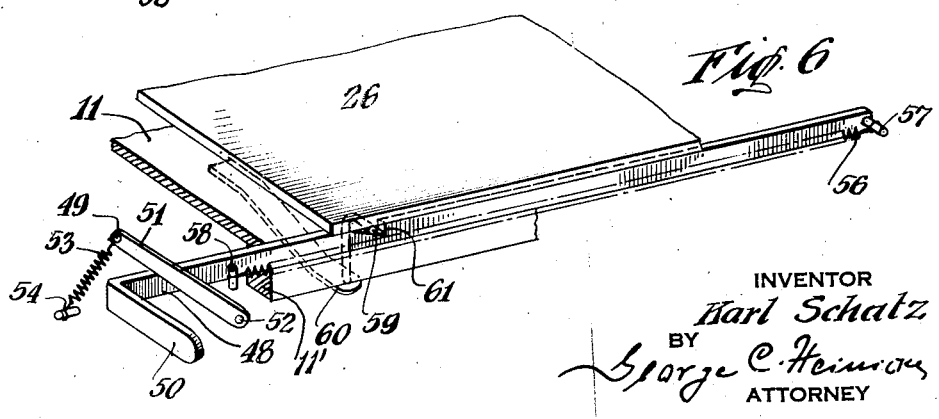

Patented June 19, 1934

1,963,718

UNITED STATES PATENT OFFICE 1,963,718

MEAT APPORTIONING MACHINE

Karl Schatz, Peekskill, N. Y.

Application March 7, 1931, Serial No. 520,967

8 Claims. (Cl. 107—8)

This invention relates to improvements in meat dispensing machines, particularly to a machine for portioning the meat used to make so-called hamburger steak sandwiches, and it is the principal object of my invention to provide a machine which will in a hygienic manner portion the meat, deposit the same on a paper upon a slide and allowing a ready withdrawal of each portion from the machine for frying etc.

Another object of my invention is the provision of such a machine equipped with means for feeding the paper upon which the meat is to be deposited and to cut the same into equal proportionate pieces.

A further object of my invention is the provision of a machine of this character which locks the dispensing slide while the meat is deposited thereon, while automatically giving the slide free for withdrawing the portion of meat cut off.

A still further object of my invention is the provision of a machine of comparatively simple and inexpensive construction, yet durable and highly efficient in operation and which will do away with the unhygienic handling of the meat to be used for hamburger sandwiches and other purposes.

These and other objects and advantages of my invention will become more fully known as the description thereof proceeds and will then be specifically defined in the appended claims.

In the accompanying drawings forming a material part of this disclosure:

Fig. 1 is a top plan view of a machine for making hamburger sandwiches constructed according to my invention.

Fig. 2 is a longitudinal section through the machine on line 2—2 of Figure 1.

Fig. 3 is a view similar to Figure 2, the section being taken on line 3—3 of Figure 1.

Fig. 4 is a cross-section on line 4—4 of Figure 3.

Fig. 5 is a cross-section on line 5—5 of Figure 1.

Fig. 6 is a perspective detail view of a locking lever and co-operating parts on an enlarged scale.

As illustrated, the machine comprises a box 10, covered on top by a cover plate 11, having a centrally located transverse depression 12 formed therein, the bottom wall of which is extended beyond the outer contour of the box as shown at 13 in Figure 4. On said extension 13 is slidably arranged a plate 14 having a front grip 15, while the outward movement of the slide plate is limited by a pin 16, Figure 5, pressed into engagement with a transverse groove 16' in the underside of plate 14 near the inner end thereof by means of a spring 17.

The rear part of plate 14 is surrounded on three of its sides by an upstanding flange 18, Figure 5, and the rear end flange is slotted, as indicated at 19, for a purpose later more fully to be described.

On top of the box 10 two longitudinally extending parallel rails 20, 21, are provided having inner grooves 22, Figure 2, in which slide the guide rails 23, 24, on the outer sides of a box like structure 25 having an open bottom and top. The lower parts of rails 20, 21, are undercut for the guidance of a knife plate 26, Figure 4, having a transverse shaft 27, Figure 2, secured to its upper end face, one end of which projects beyond the reduced rear end of guide rail 20, Figure 1, and has attached thereto the lower forked end of a link 28. The opposite forked end 29 of the link 28 is attached by means of a pin 30, Figures 3 and 4, to an operating lever 32, pivoted at its lower end to a transverse shaft 33, Figures 2 and 3, within box 10, and movable intermediate its ends in a longitudinal slot 34 in plate 11.

The outward movement of the box 25 is limited by a cross bar 35, Figures 2, and 3, removably seated in suitable notches of rails 20, and 21, Figure 2. A plunger 36 having a handle 37 is snugly fitting into the box 25 and serves to force the meat downwardly through the open bottom of 25 against plate 14. Within the box, a drum 38 having at one end a removable cover 39, Figure 3, is attached to a bracket arm 40, and extends longitudinally to the box. Within this drum a supply of tissue or waxed paper 41 is wound upon a roller 42 and issues through a slot 43 in the drum and is then guided through slot 19 above mentioned to cover plate 14.

A knife blade 44, Figures 3 and 4, of well known construction, as for instance used in paper cutters, has a handle 45 at its outer end is pivotally secured at its inner end, as at 46, to the outer face of rail 21, Figure 4, and serves to cut the paper after the plate has been drawn outwardly. The cut sheet of paper with meat thereon can then be removed from the plate and by grasping a protruding end of the paper strip, the plate can be slid back into position beneath the receptacle without crumpling the paper. A spring 47 wound about the pivot of the knife normally retains the knife in the raised position shown in Figure 3.

The plate 14 is to be secured when retracted and in order to do so there has been provided a latching bar 48 extending longitudinally of the cover plate and slidably mounted in a groove 48' formed in a depending flange 11' extending longitudinally of the cover plate between the depression 12 and one end of the cover plate. The outer end of the bar 48 is formed into a handle 50 so that it can be readily thrust inwardly across the plate 14 and the bar is held against upward movement out of the groove by an arm 51, which is pivotally mounted at one end as shown at 52 and extends across the bar. A spring 53 has one end engaged with the free end of the arm as shown at 49 and its other end anchored to a pin 54 projecting from the box. Therefore, the arm 51 will exert downward pressure upon the bar 48 to retain it in the groove. Inward movement of the bar is resisted by a spring 56 secured at one end to a pin 57 projecting from the inner end of the bar and at its other end secured to a pin 58 and outward movement of the bar by this spring is limited by engagement of the arm 51 in a notch 61 formed in the upper edge of the bar in spaced relation to the handle 50. The bar when moved inwardly to its retracted position across the plate 14 has its inner end engaged in a groove or seat 55 formed near the free end of one side portion of the flange 18 of the plate and when in this position the bar serves not only to secure the plate 14 in position beneath the receptacle 25 but also serves to fill space between the plate 14 and the wall of the receptacle directly above the plate. Therefore, pressure exerted by the plunger 36 will be prevented from forcing meat along the plate during operation of the apparatus.

The bar is to be releasably secured in its retracted position and in order to do so there has been provided a hook 59 extending upwardly from the free end of a leaf spring 60 attached at its other end to the under face of the cover plate 11. Referring to Figures 3 and 6, it will be seen that the bill of this hook projects across the upper edge of the bar 48 and when the knife plate 26 is positioned over this hook it will exert pressure upon the hook to force the hook downwardly for engagement in the notch 61 to secure the bar in its retracted position. When the knife plate moves out of a position in which it extends across the hook the hook will be moved upwardly out of the notch by its spring 60, thereby releasing the bar and permitting the bar to be moved outwardly until the arm 51 is drawn into the notch and stops this movement.

When this device is in use a quantity of meat is placed in the receptacle and pressure exerted by the plunger 36 to force the meat downwardly upon the slide 14 which is in its retracted position. At this time, the slide is secured in the retracted position by the bar 48 and the knife plate is in the extended position shown in Figure 3 in which it bears upon the hook 59 and holds the hook depressed for engagement in the notch 61 to secure the bar. The lever 32 is swung towards the right to move the knife plate inwardly to a position in which it slices through the meat in the receptacle and serves as a support for the main body of meat. As the knife plate assumes its retracted position within the receptacle the hook is released and moves upwardly out of the notch 61 thereby releasing the bar and permitting the bar to be slid outwardly until stopped by the arm 51. The slide 14 can then be drawn outwardly until stopped by engagement of the pin 16 in the notch 16' and as it moves outwardly, the sheet of paper 41 together with meat resting thereon will move out of the receptacle to a position in which the meat will be clear of the knife 44 and this knife then swung downwardly to sever the paper. The cut sheet of paper and meat resting upon the same will then be removed from the slide and by grasping the end of the paper strip protruding from the receptacle, the slide may be shoved back into place beneath the receptacle without crumpling the paper. The knife 44 returns to its raised position after the paper has been cut where it will be out of the way and after the bar 48 has been again thrust inwardly to secure the slide 14 and close space between the slide and wall of the receptacle, the lever 32 will be grasped and moved to draw the knife plate 26 outwardly to an extended position in which it moves the hook 59 downwardly into locking engagement with the bar and as the knife plate has been moved out of position to support the meat, the plunger will force the meat downwardly into position to rest upon the sheet of paper upon the retracted slide 14. The device is then ready for the knife plate to be again moved inwardly to cut off a section of meat and release the bar to permit outward movement thereof by its spring 56.

It will be understood that I have described and shown the preferred form of my invention only as one example of the many possible ways to practically construct the same, and that I may make such changes in the general arrangement thereof, and in the construction of its minor details as come within the scope of the appended claims without departure from the spirit of my invention.

Having thus described my invention, what I claim as new and desire to secure by Letters Patent is:

1. A dispensing machine comprising a container open at its bottom, a delivery plate slidable from a retracted position under said container to an extended position and when retracted being spaced below the container whereby material may pass downwardly from the container onto the plate, a blade slidable into and out of a retracted position across the open lower end of said container to sever the lower portion of a mass of material and support the main body of the mass in the container, a latch for releasably securing said delivery plate retracted, and a latch for releasably securing the first latch in position to secure the delivery plate, the second latch being moved into position to secure the first latch when said blade is moved from a position across the lower end of the container to an extended position.

2. A dispensing machine comprising a container open at its bottom, a delivery plate slidable from a retracted position under said container to an extended position and when retracted being spaced below the container whereby material may pass downwardly from the container onto the plate, a blade slidable into and out of a retracted position across the open lower end of said container to sever the lower portion of a mass of material and support the main body of the mass in the container, a bar slidable into and out of position to close space between the delivery plate and a wall of the container and releasably secure the delivery plate retracted, and a latch to releasably secure said bar in engagement with said plate moved into engagement with the bar by the blade when the blade is shifted to an extended position.

3. A dispensing machine comprising a container open at its bottom, a delivery plate slidable into and out of a retracted position, beneath said container and when retracted being spaced below the container, a slicing plate slidable horizontally into and out of position across the lower end of said container to support material in the container after severing a portion resting on the delivery plate, means for releasably securing said delivery plate retracted, and means for releasably holding the securing means for the delivery plate in a securing position actuated by movement of said slicing plate.

4. A dispensing machine comprising a container open at its bottom, a delivery plate slidable into and out of a retracted position beneath said container, means for slicing a portion from contents of the container and supporting the remainder of the contents in the container, and means for releasably holding said delivery plate retracted controlled by movement of the last mentioned means.

5. A dispensing machine comprising a container open at its bottom, a delivery plate slidable into and out of a retracted position beneath said container, means for moving material in said container downwardly through the same onto said plate, means for severing the lower portion of the material, a fastener for releasably securing said plate retracted and a latch for said fastener controlled by the severing means.

6. A dispensing machine comprising a base having a depression open at its top and one end, tracks at sides of said depression, a container over said depression open at its bottom, a delivery plate slidable in said depression through the open end thereof into and out of a retracted position to receive material from said container, a bar slidable along said base into and out of position to extend across said plate to close the open end of the depression and releasably secure the plate retracted, a latch for releasably securing said bar across said plate yieldably held out of latching engagement with the bar, a slicing plate slidable along said tracks into and out of a retracted position to extend over the depression to close the bottom of the container and sever the protruding lower portion of the material, said slicing plate engaging said latch when extended to move the latch into position to hold the bar across the delivery plate, and actuating means for said slicing plate.

7. A dispensing machine comprising a base having a depression open at its top and one end, tracks at sides of said depression, a container over said depression open at its bottom, a delivery plate slidable in said depression through the open end thereof into and out of a retracted position to receive material from said container, a bar slidable along said base into and out of position to extend across said plate to close the open end of the depression and releasably secure the plate retracted, a latch for releasably securing said bar across said plate yieldably held out of latching engagement with the bar, means for supporting a strip of paper in position to be fed into said depression and along the delivery plate, a knife for cutting a section from the paper when the delivery plate is extended, and means slidable along said tracks for severing the lower portion of material and closing the bottom of the container, said means actuating said latch.

8. In a dispensing machine, a container open at its bottom, a delivery element movable into and out of position beneath the container, a strip of paper having an end portion extending along said delivery element, means movable across the bottom of said container for severing material protruding downwardly out of the container, a fastener for holding said delivery element retracted, yieldably held out of securing engagement with the delivery element, and means for securing said fastener in position to secure the delivery element, moved into position to secure the fastener when the severing means is moved out of position across the bottom of the container.

KARL SCHATZ.